United States Patent
Baljeu

(10) Patent No.: US 11,228,509 B2
(45) Date of Patent: Jan. 18, 2022

(54) ORCHESTRATED HYBRID CLOUD SYSTEM FOR DATA PROCESSING

(71) Applicant: Atos UK International IT Services Limited, London (GB)

(72) Inventor: Nico Baljeu, Eindhoven (NL)

(73) Assignee: ATOS UK INTERNATIONAL IT SERVICES LIMITED, London (GB)

( * ) Notice: Subject to any disclaimer, the term of this patent is extended or adjusted under 35 U.S.C. 154(b) by 0 days.

(21) Appl. No.: 16/955,930

(22) PCT Filed: Dec. 18, 2018

(86) PCT No.: PCT/EP2018/085488
§ 371 (c)(1),
(2) Date: Jun. 19, 2020

(87) PCT Pub. No.: WO2019/121678
PCT Pub. Date: Jun. 27, 2019

(65) Prior Publication Data
US 2020/0344137 A1    Oct. 29, 2020

(30) Foreign Application Priority Data

Dec. 19, 2017 (FR) .................................... 1762544

(51) Int. Cl.
*H04L 12/24* (2006.01)
*G06F 9/455* (2018.01)

(52) U.S. Cl.
CPC ...... *H04L 41/5096* (2013.01); *G06F 9/45558* (2013.01); *H04L 41/5009* (2013.01); *H04L 41/5051* (2013.01); *G06F 2009/45591* (2013.01)

(58) Field of Classification Search
CPC ..... H04L 41/5054; H04L 63/08; H04L 63/10; H04L 41/5051; H04L 41/5096;
(Continued)

(56) References Cited

U.S. PATENT DOCUMENTS 9,754,303 B1 * 9/2017 Jagtap ................. G06Q 30/0621
10,290,004 B1 * 5/2019 Conboy ................. G06Q 30/08
(Continued)

OTHER PUBLICATIONS

International Search Report of the International Searching Authority for PCT/EP2018/085488 with dated Mar. 14, 2019.

*Primary Examiner* — Frantz B Jean
(74) *Attorney, Agent, or Firm* — Arc IP Law, PC; Joseph J. Mayo

(57) ABSTRACT

Orchestrated Hybrid Cloud system comprises in a heterogenous computer network environment having a plurality of resources loosely coupled to each other, the resources including memory devices and computer processors executing different operating system programs, each different operating system program having a set of kernel programs unique to that operating system program and a unique file space to constitute on one side: a SAP HANA virtual server and a SAP HANA physical server for creating on request several server instances constituting a server farm and managing an in-memory, column-oriented, relational database management system for storing data in main electronic memory of the resources, and on other side: a SAP application server using a row-oriented relational database management systems for storing data in disk memory, and subordinate programs operating together with the computer processors, at least some of the resources being available to perform remote execution services for application server farm.

8 Claims, 3 Drawing Sheets

(58) Field of Classification Search
CPC .............. H04L 41/5009; G06F 11/3093; G06F 9/45558; G06F 11/3055; G06F 21/44; G06F 11/3006; G06F 21/45; G06F 2009/45591; H04W 12/06; H04W 12/08; G06Q 10/06
USPC ........................................................ 709/224
See application file for complete search history.

(56) References Cited

U.S. PATENT DOCUMENTS

| | | | |
|---|---|---|---|
| 2010/0235335 A1* | 9/2010 | Heman | G06F 16/221 707/703 |
| 2014/0278623 A1* | 9/2014 | Martinez | G06Q 10/06 705/7.12 |
| 2014/0359283 A1* | 12/2014 | Lee | H04L 67/2852 713/165 |
| 2014/0365662 A1* | 12/2014 | Dave | G06Q 30/02 709/226 |
| 2015/0295731 A1* | 10/2015 | Bagepalli | H04L 12/6418 370/401 |
| 2017/0180211 A1* | 6/2017 | Johnson | H04L 41/0893 |
| 2019/0146810 A1* | 5/2019 | Ganesh | H04L 43/0888 718/1 |

\* cited by examiner

ORCHESTRATED HYBRID CLOUD SYSTEM FOR DATA PROCESSING

TECHNICAL FIELD OF THE INVENTION

The invention relates to the field of hybrid cloud system for enterprise resource planning, in particular SAP.

STATE OF THE PRIOR ART

Enterprise Resource Planning (ERP) is the integrated management of core business processes, often in real-time and mediated by software and technology. SAP (Systems, Applications and Products for data processing) is an ERP extremely used to manage companies. Due to the evolution of virtualization technologies in recent years, Cloud platform systems are more and more used to run ERP such as SAP. However theses platforms can be public such as Amazon's AWS®, Microsoft Azure®, but also private or hybrid. Hybrid cloud system combines private and public cloud in a tailored cloud infrastructure to ensure amagility, value and sustainable performance. However public and private clouds do not share the same infrastructure and functionality(ies).

In consequence, there is no single centralized end to end procedure to guide the overall application deployment across disparate infrastructures in particular for SAP, in hybrid cloud infrastructure.

DISCUSSION OF THE INVENTION

The present invention therefore has the object of proposing an orchestrated hybrid cloud system for SAP, giving the possibility of overcoming at least one portion of the drawbacks of the prior art.

The orchestrated hybrid cloud system for SAP is comprising at least:
- a cloud service (Bluebox) interfacing module for interfacing with user management modules, configured to enable user to subscribe to information of cloud computing services and supported by at least one cloud service provider of hybrid cloud;
- a cloud service consuming interface module (SAP LaMa) of interfacing module (bluebox), configured to receive a cloud service user request of at least one cloud service requester of WEB service, application and user, and return a cloud service user response to the cloud service requester;
- a cloud service processing module (ServiceNow), configured to parse and orchestrate a cloud service requested to consume from the cloud service user request, to select the cloud computing services and/or resources provided by the cloud service provider and/or a function mode, and execute a cloud service operation; a cloud service adapting module, configured to protocol adapt or call the cloud computing services and/or resources provided by the cloud service provider;

wherein the orchestrated Hybrid Cloud system comprises in a heterogenous computer network environment supporting and allowing the cloud computing services, said heterogenous computer network environment having a plurality of resources loosely coupled to each other in the network environment, the resources including memory devices and at least two or more computer processors executing different operating system programs, each different operating system program having a set of kernel programs unique to that operating system program and a unique file space to constitute on one side:

a SAP HANA virtual server and a SAP Hana physical server for creating on request several server instances constituting a server farm and managing an in-memory, column-oriented, relational database management system for storing data in main electronic memory of the resources, and on other side: a SAP application server using a row-oriented relational database management systems for storing data in disk memory, and subordinate programs operating together with the computer processors, at least some of the resources being available to perform remote execution services for application server farm.

Orchestrated hybrid cloud system, wherein the cloud interfacing module comprises in addition to consuming interface module (SAP LaMa) a metadata register (MDR) using an access protocol of Lightweight Directory Access Protocol type (LDAP) and connected through an enterprise service bus (ESB) to the service processing technological framework (ServiceNow).

Orchestrated hybrid cloud system, wherein SAP administration is supported by cloud service BlueBox for security audit and backup monitoring purpose and provisioning by:
- Distribution of SAP monitoring templates by Automatically provisioning of computing resources in virtual environments;
- Software Control and Distribution for Distributing of Monitoring agents;
- Patch Management for providing Regular patching of Monitoring agents;
- Security Compliancy for satisfying Security compliance according rules, laws and IT Controls;
- System Management for providing System administration task automation, central administration, Inventory, Detailed software inventory for SAP and Used as data source for CMDB.

Orchestrated hybrid cloud system, wherein cloud service processing include a service level management module providing an interface for enabling a user to determine any of the following parameters:
- time window for support availability,
- time window for incident handling depending on priority,
- time window for change handling,
- Enterprise resource planning (ERP) dialog response time,
- virtual Hana server size,
- physical Hana server size,
- initial and minimal Hana storage size,
- data recovery parameter such as RPO recovery point objective, or RTO recovery time objective.

Orchestrated hybrid cloud system, wherein cloud service processing module comprises at least one of:
- a catalogue and process orchestration module for orchestrating several requests on several server instances with a data protection management functionality, configured to store the information of cloud computing services and/or resources;
- a security module, configured to provide security assurance for the cloud service requester to access a cloud service;
- a monitoring management module, configured to monitor a running status of the cloud service.

Orchestrated hybrid cloud system, wherein the cloud service processing module, is configured to:
- receiving a workflow, the workflow defining a flow of discrete activities and paths of execution connecting the activities such that some activities can be executed concurrently, the workflow having a corresponding electronically-stored representation of a service level management (SLA), the SLA comprising a set of rules governing execution of the workflow;

analyzing the workflow to identify sub-workflows that can be executed independently, a sub-workflow comprising a set of one or more of the activities each connected on a path of execution of the workflow;

obtaining information about a plurality of online service providers, each online service provider comprising one or more computers that together provide an online service;

selecting different service providers among the providers to perform the sub-workflows, respectively, where the service providers are selected based on criteria concerning the access time rapidity as applied to the information about the online service providers; and transmitting the sub-workflows via a network to the corresponding online service providers to execute the sub-workflows.

Orchestrated hybrid cloud system, wherein the cloud service:

aggregate a plurality of accounts and a plurality of account credentials utilized for accessing online services, wherein plurality of users each having plurality of accounts, and one or more of the plurality of accounts having enterprise-only data and non-enterprise data;

monitor a context associated with the plurality of accounts; and utilize the context and data associated with the plurality of accounts and the plurality of account credentials for at least one of the automating tasks and providing alerts associated with the data.

Orchestrated hybrid cloud system, wherein for authenticating cloud-based virtual machines within a secure hybrid cloud, comprising:

an applet included within a cloud-based virtual Hana machine to be authenticated;

a cloud broker communicatively connected to the cloud-based virtual HANA machine via a secured connection;

a credentialing service accessible to the applet via a service mode community of interest including the cloud-based virtual HANA machine and the credentialing service; and an authorization service accessible to the applet via a role VPN community of interest including the cloud-based virtual HANA machine and the authorization service.

SHORT DESCRIPTION OF THE FIGURES

Other features, details and advantages of the invention will become apparent upon reading the description which follows with reference to the appended figures, which illustrate:

DETAILED DESCRIPTION OF DIFFERENT EMBODIMENTS OF THE INVENTION

Many combinations may be contemplated without departing from the scope of the invention; one skilled in the art will select either one depending on economical, ergonomical, dimensional constraints or others which he/she will have to observe.

Figure 1:
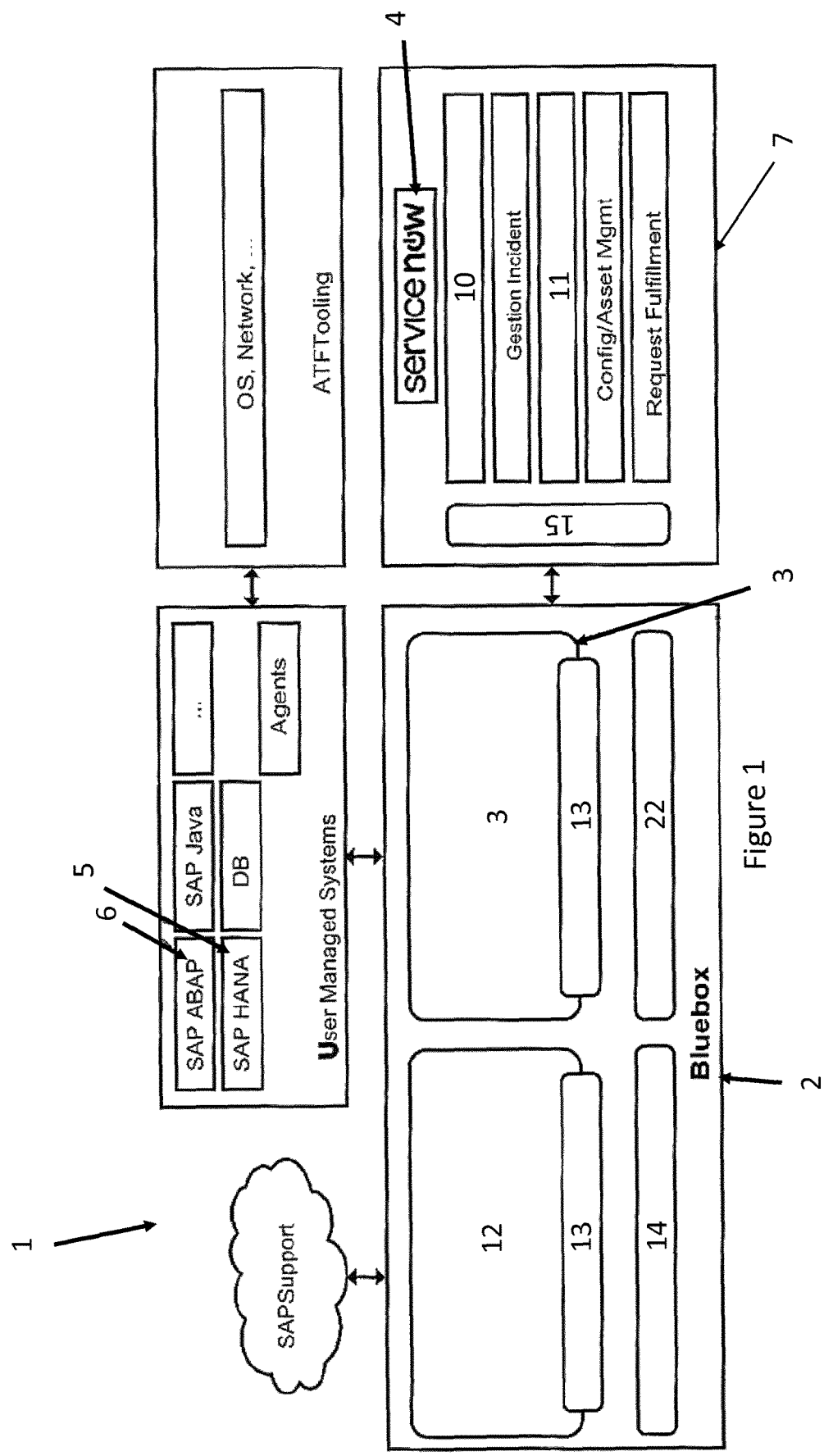
FIG. 1, illustrates an overview of the cloud service interfacing module Bluebox.

More particularly, according to an embodiment illustrated by FIG. 1, the orchestrated Hybrid Cloud system comprises, in a heterogeneous computer network environment having a plurality of resources loosely coupled to each other in the network environment, resources including memory devices and at least two or more computer processors executing different operating system programs, each different operating system program having a set of kernel programs unique to that operating system program and a unique file space to constitute on one side:

a SAP HANA virtual server and a SAP HANA physical server for creating on request several server instances constituting a server farm and managing an in-memory, column-oriented, relational database management system for storing data in main electronic memory of the resources, and on other side:

a SAP application server using a row-oriented relational database management systems for storing data in disk memory, and subordinate programs operating together with the computer processors, at least some of the resources being available to perform remote execution services for application server farm.

Figure 2:
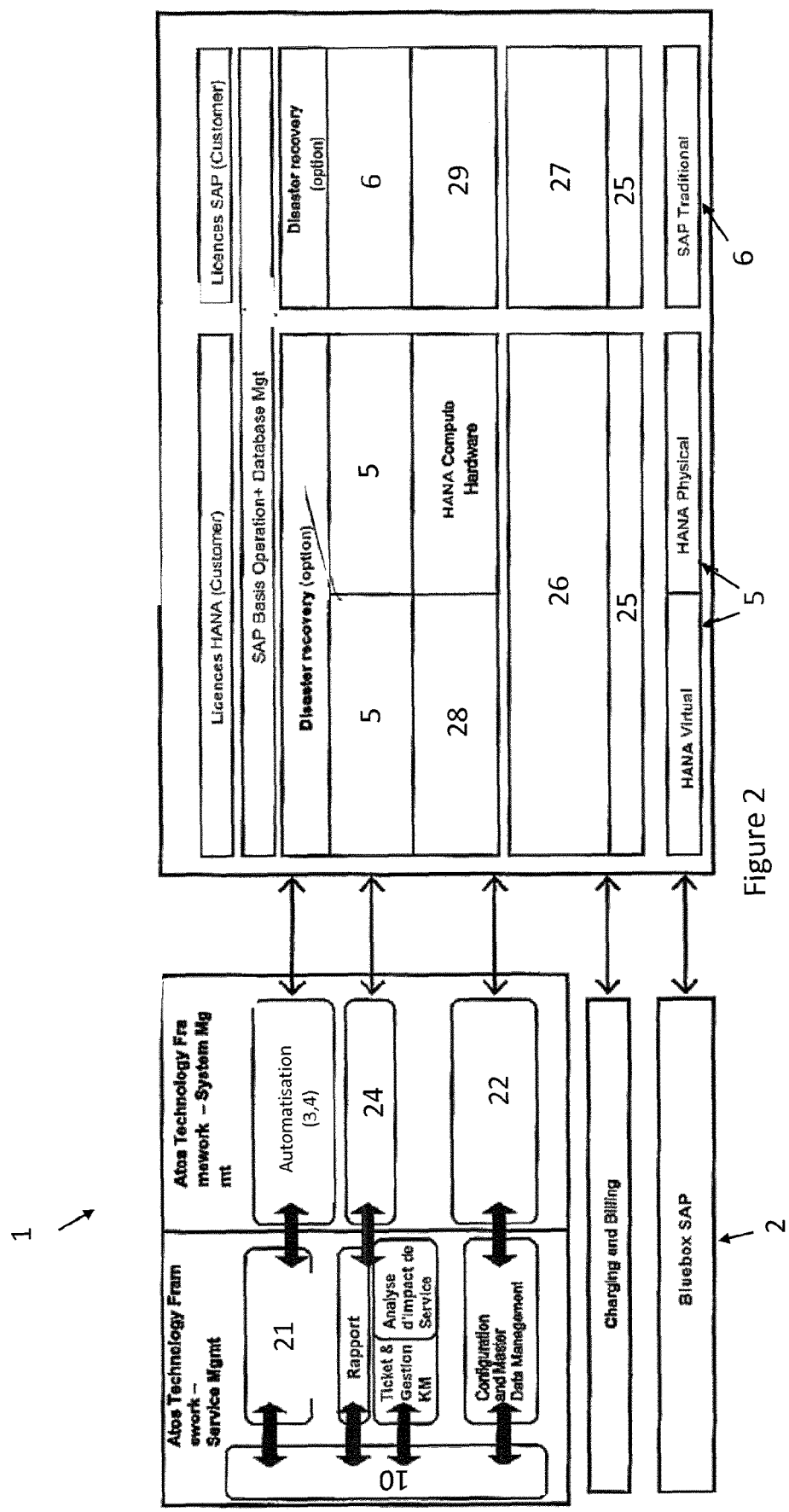
FIG. 2, represents an overview of the module components of Orchestrated hybrid cloud system.

The Orchestrated Hybrid Cloud System infrastructure is allocated thanks to the implemented modules. The interactions between both are represented FIG. 2. The client, through the module, can choose to upscale the allocated resources, with slice of HANA or traditional storage (26, 27) by increments of 100 Go whereas for HANA and Traditional SAP compute T-shirts (28, 29) the increments are respectively of 128 GB and 8 GB.

Figure 3:
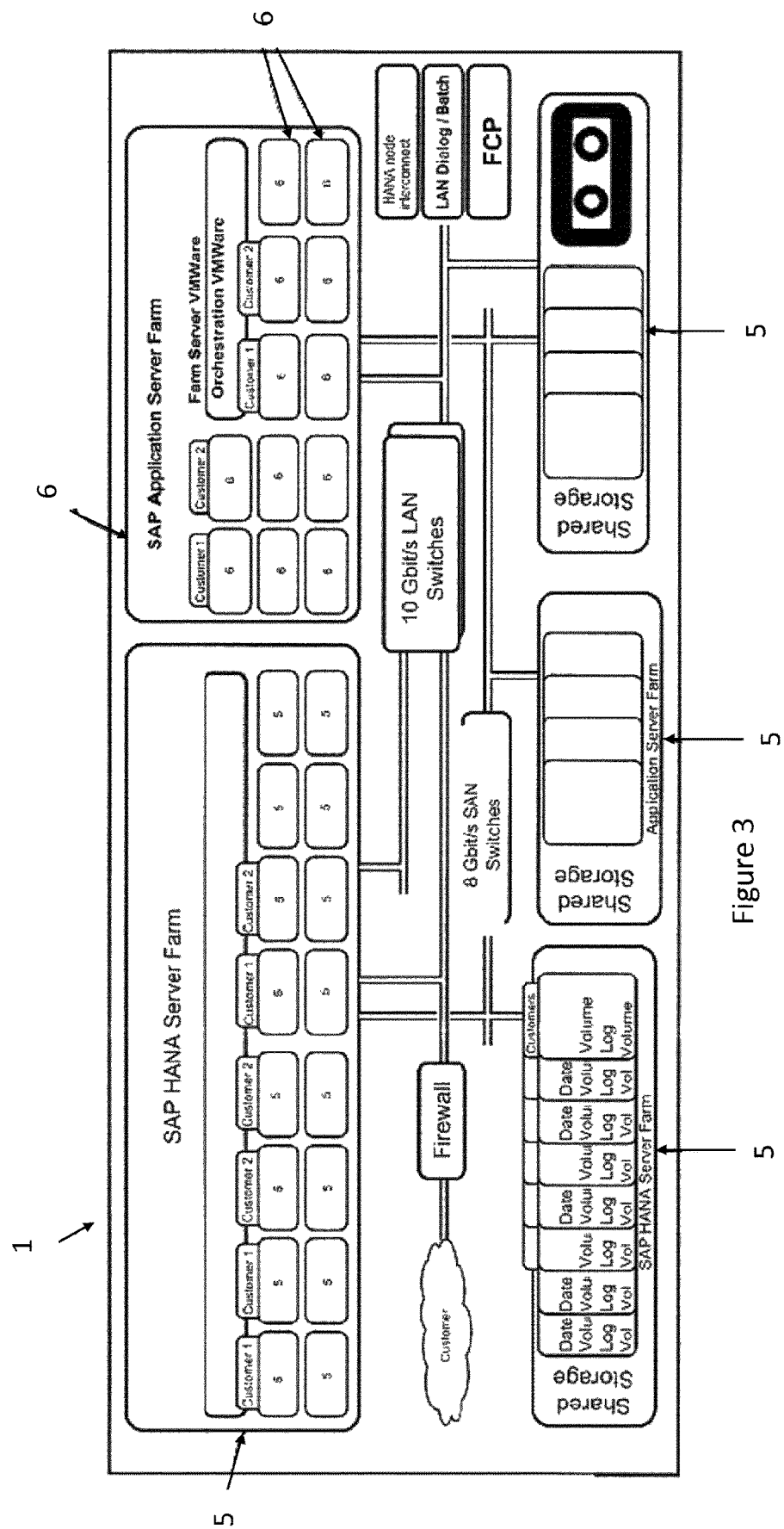
FIG. 3, represents an overview of the technical structure of Orchestrated hybrid cloud system.

The server farms and how they communicate with the client is shown in FIG. 3. As shown, the storage can be shared in SAP HANA farm and/or in Application Server Farm between multiple different customers, each customer protected by a Firewall, and the servers being physical and/or virtual. The servers are allocated to the customers by the modules (not represented here) depending on the service requests.

The use of HANA virtual server allows multiple instances to be created on one physical server as the instances are virtualised. This increases the utilisation of the hardware and reduces the cost for the customer as no need to procure multiple hardware.

To allow SAP running in such hybrid environment the orchestrated Hybrid Cloud system comprises a cloud service interfacing module (2) (Bluebox) and a cloud service adapting module, configured to adapt protocols or call the cloud computing services and/or resources provided by the cloud service provider.

The cloud service interfacing module (2) (Bluebox) is a module for interfacing with user management modules. It is configured to enable user to subscribe to information of cloud computing services and to be supported by at least one cloud service provider of hybrid cloud. The BlueBox can comprise FRUN module, SAP LaMa module, ART module and MDR/LDAP module.

The FRUN (Focussed RUN) module (12) is the successor of SAP solution manager and used to monitor and maintain SAP systems.

The SAP LaMa (Landscape Management) module (3) is configured to receive a cloud service user request of at least one cloud service requester of WEB service, application and user, and return a cloud service user response to the cloud service requester In addition, for some embodiments, the FRUN and/or SAP LaMa modules can comprise additional Interfacing AddOns (13) allowing theses modules to interface and communicate with other module of the hybrid cloud system. Indeed these modules were not originally intended to communicate with hybrid cloud system modules under the original SAP infrastructure. Therefore the Interfacing AddOns resulting in an integrated communication with hybrid cloud give to the user new function and easy deployment of applications through the hybrid cloud system.

The ART module (14) comprises developed tooling to perform security check and can carry out more monitoring if required by the user The MDR/LDAP module is a metadata register (MDR) (22) using an Lightweight Directory Access Protocol (LDAP) and connected through an Enterprise Service Bus (ESB)/EVR (15) to the service processing technological framework (7) (ATF)

The service processing technological framework (7) (ATF) comprises at least cloud service processing module (4) (ServiceNow), configured to parse and orchestrate a cloud service requested to consume from the cloud service user request, to select the cloud computing services and/or resources provided by the cloud service provider and/or a function mode, and execute a cloud service operation.

Thus, as shown in FIG. 1, the customer will have access to a cloud service processing module (ServiceNow) portal. The customer selects the required service request in this online portal. Said portal automatically initiates a set of pre-defined scripted responses. The responses will interact with a cloud service consuming interface module (3) (SAP LaMa) of a cloud service interfacing module (2) (Bluebox) to perform some of the service requests in the catalog, such as the deployment of a SAP system with SAP HANA server (5) and SAP application server (6) relative to the service requests the user has selected. ServiceNow can comprise:
  a portal module
  a catalogue and process orchestration module (21) for orchestrating several requests on several server instances with a data protection management functionality (23), configured to store the information of cloud computing services and/or resources;
  a security module, configured to provide security assurance for the cloud service requester to access a cloud service;
  a monitoring management module (24), configured to monitor a running status of the cloud service;
  a service level management module (11) providing an interface for determining any of the following parameters:
    time window for support availability,
    time window for incident handling depending on priority,
    time window for change handling,
    Enterprise resource planning (ERP) dialog response time,
    virtual Hana server size,
    physical Hana server size,
    initial and minimal Hana storage size,
    data recovery parameter such as RPO recovery point objective, or RTO recovery time objective.Service Level
  a catalogue and process orchestration module for orchestrating several requests on several server instances with a data protection management functionality, configured to store the information of cloud computing services and/or resources;
  a security module, configured to provide security assurance for the cloud service requester to access a cloud service;
  a monitoring management module, configured to monitor a running status of the cloud service;
  or any combination theses modules ServiceNow may be configured to:
  receiving a workflow, the workflow defining a flow of discrete activities and paths of execution connecting the activities such that some activities can be executed concurrently, the workflow having a corresponding electronically-stored representation of a service level agreement (SLA), the SLA comprising a set of rules governing execution of the workflow;
  analyzing the workflow to identify sub-workflows that can be executed independently, a sub-workflow comprising a set of one or more of the activities each connected on a path of execution of the workflow;
  obtaining information about a plurality of online service providers, each online service provider comprising one or more computers that together provide an online service;
  selecting different service providers among the two providers to perform the sub-workflows, respectively, where the service providers are selected based on criteria concerning the access time rapidity as applied to the information about the online service providers; and
  transmitting the sub-workflows via a network to the corresponding online service providers to execute the sub-workflows.

In some embodiment, the hybrid cloud platform include a user managed systems, which can comprise different module as for example:
  SAP ABAP
  SAP Java
  SAP HANA
  Data bases
  User Management Server
  Agents The bluebox module is the interfacing module between user management modules and the cloud service processing module (ServiceNow).

It will be easily understood upon reading the present application that the particularities of the present invention, as generally described and illustrated in the figures, may be arranged and designed according to a great variety of different configurations. Thus, the description of the present invention and the related figures are not provided for limiting the scope of the invention but simply illustrating selected embodiments.

One skilled in the art will understand that the technical features of a given embodiment may in fact be combined with features of another embodiment unless the opposite is explicitly mentioned or if it is obvious that these features are incompatible. Further, the technical features described in a given embodiment may be isolated from the other features of this embodiment unless the opposite is explicitly mentioned.

It should be obvious for persons skilled in the art that the present invention allows embodiments under many other specific forms without departing from the field defined by the scope of the appended claims, these embodiments should be considered as an illustration and the invention should not be limited to the details given above.

Glossary

1 Orchestrated Hybrid Cloud system for SAP
2 cloud service (Bluebox) interfacing module 3 cloud service consuming interface module (SAP LaMa)
4 cloud service processing module (ServiceNow)
5 SAP HANA virtual/physical server
6 SAP application server
7 service processing technological framework
10 portal module
11 service level management module
12 FRUN (Focussed RUN) module
13 Interfacing AddOns
14 ART module
15 Enterprise Service Bus (ESB)/EVR
21 a catalogue and process orchestration
22 metadata register
23 data protection management functionality
24 a monitoring management module
25 Data protection
26 HANA storage
27 traditional storage
28 HANA SAP compute T-shirts
29 Traditional SAP compute T-shirts

What is claimed is:

1. An Orchestrated Hybrid Cloud system for data processing, comprising:
   a processor;
   a plurality of modules;
   a memory configured to store the plurality of modules wherein said plurality of modules are executable by the processor;
   the plurality of modules comprising:
   a cloud service interfacing module for interfacing with user management modules, configured to enable a user to subscribe to information of cloud computing services and supported by at least one cloud service provider of hybrid cloud;
   a cloud service consuming interface module in communication with the cloud service interfacing module configured to receive a cloud service user request of at least one cloud service requester of WEB service, application and said user, and return a cloud service user response to the at least one cloud service requester;
   a cloud service processing module in communication with the cloud service consuming interface module, configured to parse and orchestrate a cloud service requested to consume from the cloud service user request, to select the cloud computing services and/or resources provided by the at least one cloud service provider and/or a function mode, and execute a cloud service operation;
   a cloud service adapting module in communication with the cloud service processing module, configured to protocol adapt or call the cloud computing services and/or resources provided by the at least one cloud service provider;
   heterogeneous computer network environment supporting and allowing the cloud computing services, said heterogeneous computer network environment having a plurality of resources loosely coupled to each other in the heterogeneous computer network environment, the plurality of resources including memory devices and at least two or more computer processors executing different operating system programs, each different operating system program having a set of kernel programs unique to that operating system program and a unique file space to constitute on one side:
   a data processing virtual server and a data processing physical server for creating on request several server instances constituting a server farm and managing an in-memory, column-oriented relational database management system for storing data in main electronic memory of the resources, and on other side:
   another data processing server using a row-oriented relational database management systems for storing said data in disk memory, and subordinate programs operating together with the at least two or more computer processors, at least some of the resources being available to perform remote execution services for application server farm.

2. The Orchestrated Hybrid Cloud system according to claim 1, wherein the cloud service consuming interfacing module comprises, in addition to the cloud service consuming interface module, a metadata register (MDR) using an access protocol of Lightweight Directory Access Protocol type (LDAP) and connected through an enterprise service bus (ESB) to the cloud service processing module.

3. The Orchestrated Hybrid Cloud system according to claim 1, wherein data processing administration is supported by the cloud service for security audit and backup monitoring purpose and provisioning by:
   distribution of data processing monitoring templates by automatically provisioning of computing resources in virtual environments;
   software control and distribution for distributing of monitoring agents;
   patch management for providing regular patching of said monitoring agents;
   security compliancy for satisfying security compliance according rules, laws and IT Controls;
   system management for providing system administration task automation, central administration, inventory, detailed software inventory for data processing and used as data source for configuration management database (CMDB).

4. The Orchestrated Hybrid Cloud system according to claim 1, wherein cloud service processing module include a service level management module providing an interface for enabling said user to determine one or more parameters comprising:
   a time window for support availability,
   a time window for incident handling depending on priority,
   a time window for change handling,
   an enterprise resource planning (ERP) dialog response time,
   a virtual Hana server size,
   a physical Hana server size,
   an initial and minimal Hana storage size,
   a data recovery parameter such as RPO recovery point objective, or RTO recovery time objective.

5. The Orchestrated Hybrid Cloud system according to claim 1, wherein the cloud service processing module comprises at least one of:
   a catalog and process orchestration module for orchestrating several requests on several server instances with a data protection management functionality, configured to store the information of said cloud computing services and/or said resources;
   a security module, configured to provide security assurance for the at least one cloud service requester to access the cloud service;
   a monitoring management module, configured to monitor a running status of the cloud service.

6. The Orchestrated Hybrid Cloud system, according to claim 1, wherein the cloud service processing module, is configured to:

receiving a workflow, the workflow defining a flow of discrete activities and paths of execution connecting the discrete activities such that some activities of the discrete activities can be executed concurrently, the workflow having a corresponding electronically-stored representation of a service level management (SLA), the SLA comprising a set of rules governing execution of the workflow;

analyzing the workflow to identify sub-workflows that can be executed independently, a sub-workflow comprising a set of one or more of the discrete activities each connected on a path of execution of the workflow;

obtaining information about a plurality of online service providers, each online service provider comprising one or more computers that together provide an online service;

selecting different service providers among the plurality of online service providers to perform the sub-workflows, respectively, where the different service providers are selected based on criteria concerning access time rapidity as applied to the information about the plurality of online service providers; and transmitting the sub-workflows via a network to corresponding online service providers to execute the sub-workflows.

7. The Orchestrated Hybrid Cloud system, according to claim 1, wherein the cloud service:

aggregate a plurality of accounts and a plurality of account credentials utilized for accessing online services, wherein plurality of users each having the plurality of accounts, and one or more of the plurality of accounts having enterprise-only data and non-enterprise data;

monitor a context associated with the plurality of accounts; and utilize the context and data associated with the plurality of accounts and the plurality of account credentials for at least one of automating tasks and providing alerts associated with the data.

8. An Orchestrated Hybrid Cloud system for authenticating cloud-based virtual machines within a secure hybrid cloud, comprising:

a processor;

a plurality of modules;

a memory configured to store the plurality of modules wherein said plurality of modules are executable by the processor;

the plurality of modules comprising:

a cloud service interfacing module for interfacing with user management modules, configured to enable user to subscribe to information of cloud computing services and supported by at least one cloud service provider of hybrid cloud;

a cloud service consuming interface module in communication with the cloud service interfacing module configured to receive a cloud service user request of at least one cloud service requester of WEB service, application and the user, and return a cloud service user response to the at least one cloud service requester;

a cloud service processing module in communication with the cloud service consuming interface module, configured to parse and orchestrate a cloud service requested to consume from the cloud service user request, to select the cloud computing services and/or resources provided by the at least one cloud service provider and/or a function mode, and execute a cloud service operation;

a cloud service adapting module in communication with the cloud service processing module, configured to protocol adapt or call the cloud computing services and/or the resources provided by the at least one cloud service provider;

a heterogeneous computer network environment supporting and allowing the cloud computing services, said heterogeneous computer network environment having a plurality of resources loosely coupled to each other in the heterogeneous computer network environment, the plurality of resources including memory devices and at least two or more computer processors executing different operating system programs, each different operating system program having a set of kernel programs unique to that operating system program and a unique file space to constitute on one side:

a data processing virtual server and a data processing physical server for creating on request several server instances constituting a server farm and managing an in-memory, column-oriented relational database management system for storing data in main electronic memory of the resources, and on other side:

another data processing server using a row-oriented relational database management systems for storing data in disk memory, and subordinate programs operating together with the at least two or more computer processors, at least some of the resources being available to perform remote execution services for application server farm;

an applet included within a cloud-based virtual machine to be authenticated;

a cloud broker communicatively connected to the cloud-based virtual machine via a secured connection;

a credentialing service accessible to the applet via a service mode community of interest including the cloud-based virtual machine and the credentialing service; and an authorization service accessible to the applet via a role VPN community of interest including the cloud-based virtual machine and the authorization service.

\* \* \* \* \*